United States Patent
Hung

(10) Patent No.: US 9,170,150 B2
(45) Date of Patent: Oct. 27, 2015

(54) OPTICAL FIBER ASSEMBLY WITH PRISM TO DETECT LIGHT INTENSITY OF LIGHT BEAM ENTERING OPTICAL FIBER

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 169 days.

(21) Appl. No.: 13/873,155

(22) Filed: Apr. 29, 2013

(65) Prior Publication Data

US 2014/0175268 A1 Jun. 26, 2014

(30) Foreign Application Priority Data

Dec. 21, 2012 (TW) .............................. 101148887 A

(51) Int. Cl.
*G01J 1/04* (2006.01)
*G01J 1/16* (2006.01)
*G01J 1/42* (2006.01)

(52) U.S. Cl.
CPC ............. *G01J 1/0477* (2013.01); *G01J 1/0411* (2013.01); *G01J 1/0425* (2013.01); *G01J 1/16* (2013.01); *G01J 1/4228* (2013.01)

(58) Field of Classification Search
CPC ......... G01J 1/04; G01J 1/4228; G01J 1/0407; G01J 1/0477; G01J 1/0425; G01J 1/0411; G01J 1/16; B23Q 17/24; B23Q 17/2404; B23Q 17/2409; G01D 5/286; G01D 5/35383; G01D 5/353; G01D 5/35303; G01D 5/35354; G01D 5/35367; G11B 7/1359; G02B 6/2804; G02B 5/04; G02B 7/1805; G02B 17/086; G02B 17/04; G02B 5/265; G02B 6/34; G02B 6/4214; G02B 6/2817; G02B 7/18
USPC ............... 250/227.11, 227.14, 227.28, 578.1, 250/205; 359/438, 832, 833, 834, 836; 385/36

See application file for complete search history.

(56) References Cited

U.S. PATENT DOCUMENTS

2012/0263416 A1* 10/2012 Morioka ........................ 385/33

* cited by examiner

*Primary Examiner* — Georgia Y Epps
*Assistant Examiner* — Carolynn A Moore
(74) *Attorney, Agent, or Firm* — Novak Druce Connolly Bove + Quigg LLP

(57) ABSTRACT

An optical fiber assembly includes a prism, four first collimating portions, four second collimating portions, two third collimating portion, two light emitting elements, two light receiving elements, four optical fibers, and two light intensity detectors. The prism includes an incident surface, a first reflecting surface, a first emergent surface, a second reflecting surface, and a second emergent surface. The first collimating portions are positioned on the incident surface. The second collimating portions are positioned on the first emergent surface. The third collimating portions are positioned on the second emergent surface. Each light emitting element faces one of the first collimating portions for emitting light beams. Each light receiving element faces one of the first collimating portions. Each optical fiber faces one of the second collimating portions. Each light intensity detector faces one of the third collimating portions for detecting light intensity of a corresponding light emitting element.

6 Claims, 3 Drawing Sheets

OPTICAL FIBER ASSEMBLY WITH PRISM TO DETECT LIGHT INTENSITY OF LIGHT BEAM ENTERING OPTICAL FIBER

BACKGROUND

1. Technical Field

The present disclosure relates to optical fiber assemblies and, particularly, to an optical fiber assembly capable of detecting light intensity.

2. Description of Related Art

An optical fiber assembly includes a light emitting element, an optical fiber, and a prism. The prism includes a reflecting surface, which is positioned in a light path between the light emitting element and the optical fiber. In use, the light emitting element emits light beams, and the reflecting surface reflects the light beams to the optical fiber and thus to external optical elements. The light beams may be attenuated at the reflecting surface. However, the optical fiber assembly cannot detect light intensity of the light beams reflected off the prism and determine if the attenuation of the light beams is acceptable.

Therefore, it is desirable to provide an optical fiber assembly that can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
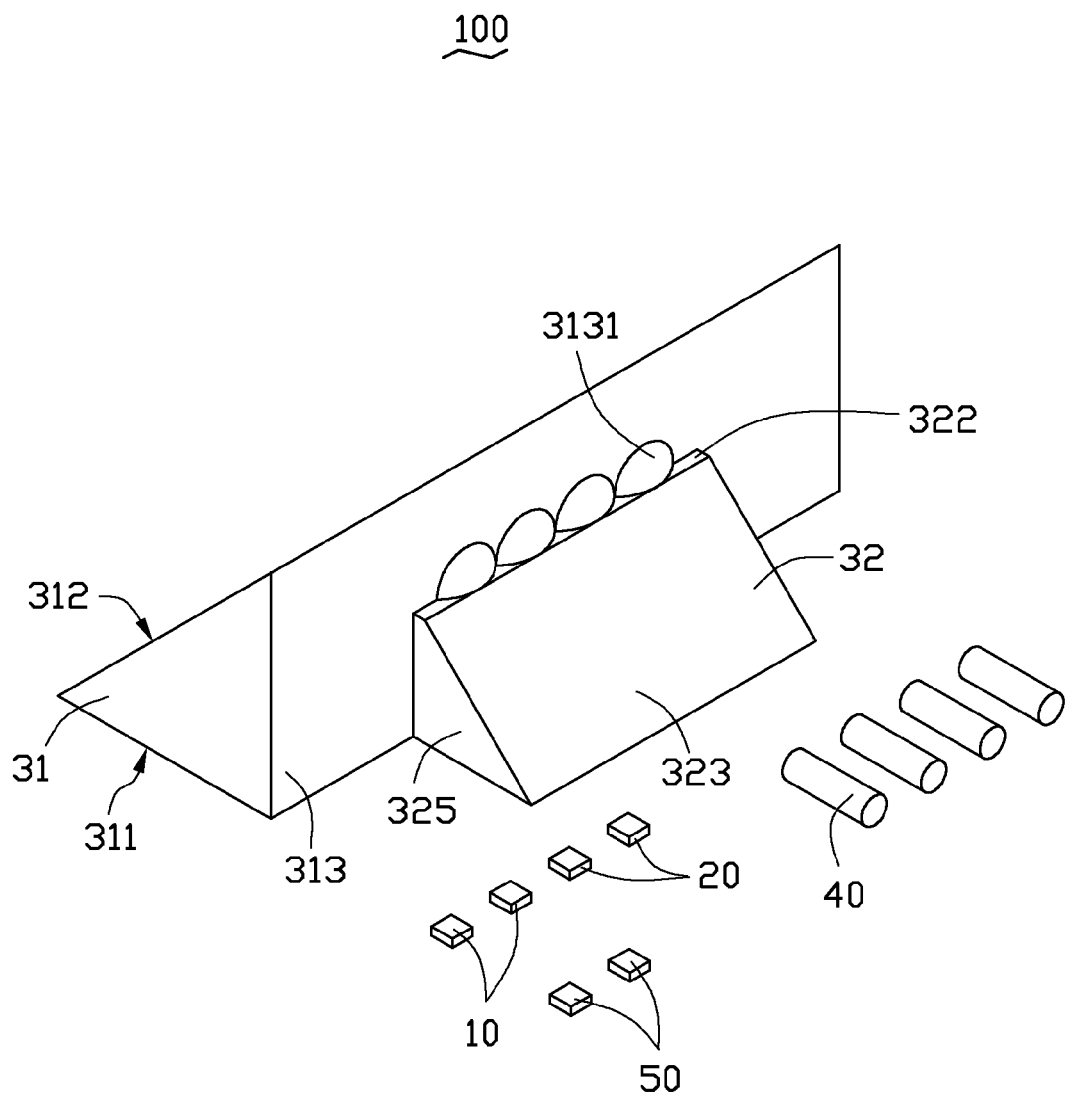
FIG. 1 is an isometric schematic view of one embodiment of an optical fiber assembly.
Figure 2:
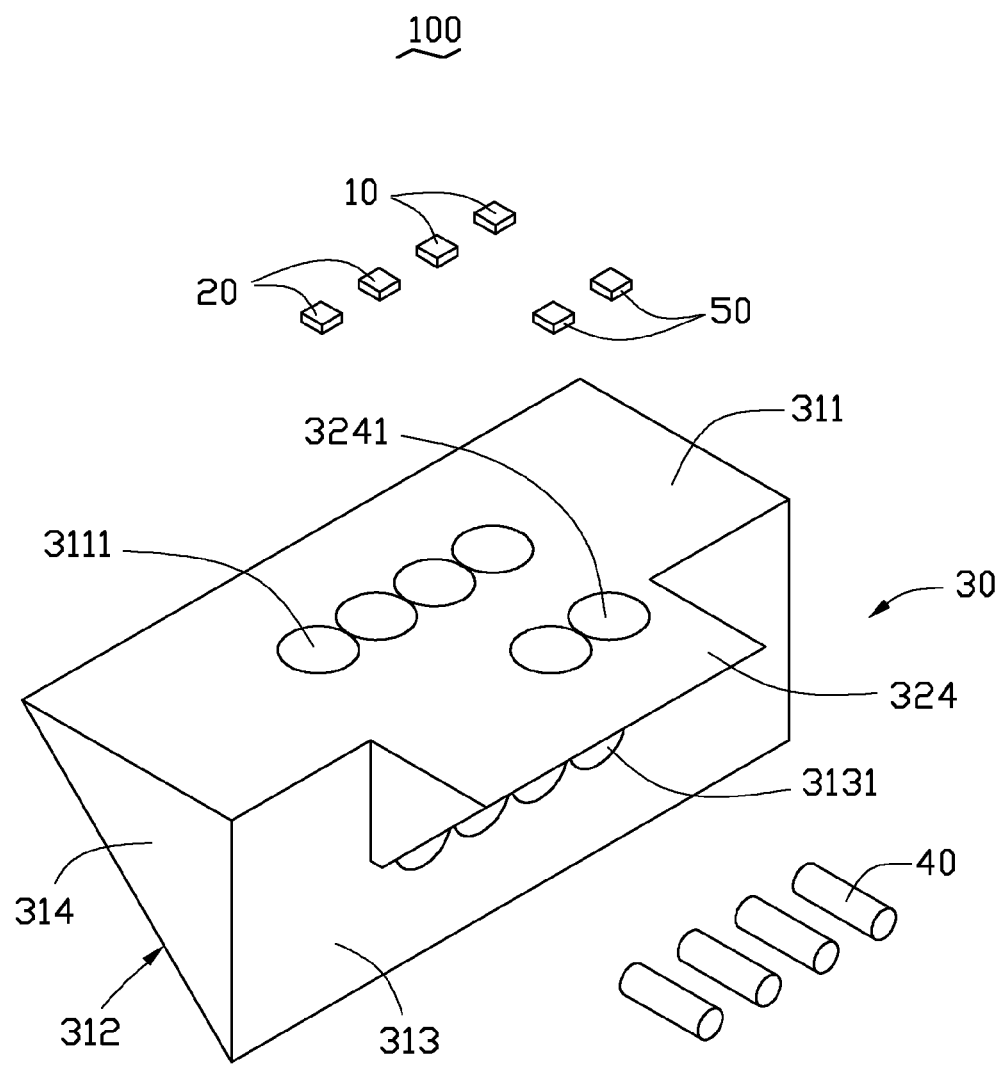
FIG. 2 is similar to FIG. 1, but viewed from another angle.

FIGS. 1 and 2 show one embodiment of an optical fiber assembly 100. The optical fiber assembly 100 includes two light emitting elements 10, two light receiving elements 20, a prism 30, four optical fibers 40, and two light intensity detectors 50.

Each light emitting element 10 can be a laser light source or a light emitting diode (LED) light source. In the embodiment, each light emitting element 10 is a vertical-cavity surface emitting laser (VCSEL) light source. Each light receiving element 20 is a photoelectric diode (PD). The light emitting element 10 is used to emit light beams and project the light beams to the prism 30.

The prism 30 includes a first part 31 and a second part 32. The first part 31 can be triangular-prism shaped and includes an incident surface 311, a first reflecting surface 312, and a first emergent surface 313. The incident surface 311, the first reflecting surface 312, and the emergent surface 313 are sequentially connected to each other. The incident surface 311 is substantially perpendicular to the first emergent surface 313. An included angle between the incident surface 311 and the first reflecting surface 312 is about 45 degrees. An included angle between the first emergent surface 313 and the first reflecting surface 312 is also about 45 degrees. The first part 31 also includes two first side surfaces 314. The first reflecting surface 312 is connected between and substantially perpendicular to the first side surfaces 314. Each first side surface 314 is substantially an isosceles right triangle.

Four first collimating portions 3111 are positioned on the incident surface 311. In the embodiment, the first collimating portions 3111 are arranged in a line and formed as circular convex lenses. An optical axis of each first collimating portion 3111 is substantially perpendicular to the incident surface 311 and substantially parallel to the first emergent surface 313. Each of the light emitting elements 10 and the light receiving elements 20 is spaced from and faces a respective one of the first collimating portions 3111. A central axis of each of the light emitting element 10 and the light receiving element is substantially coaxial with the optical axis of a respective first collimating portion 3111.

Figure 3:
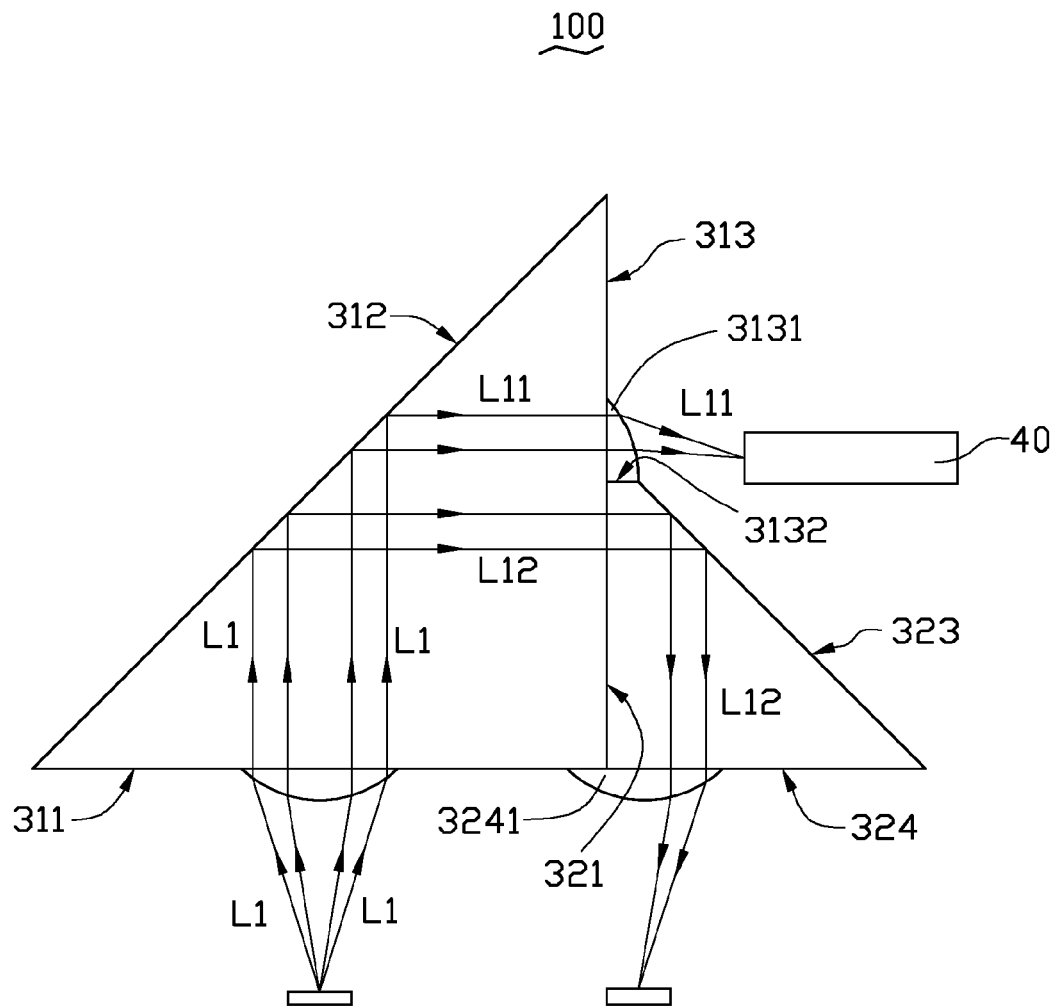
FIG. 3 is cross-sectional view of the optical fiber assembly of FIG. 1.

FIG. 3 shows four second collimating portions 3131 positioned on the first emergent surface 313. In the embodiment, the second collimating portions 3131 are arranged in a line and formed as semi-circular convex lenses. An optical axis of the second collimating portion 3131 is substantially perpendicular to the first emergent surface 313 and substantially parallel to the incident surface 311. Each second collimating portion 3131 corresponds to a first collimating portion 3111 and includes a bottom surface 3132 passing a diameter of each second collimating portion 3131. The bottom surface 3132 is substantially parallel to the incident surface 311. One end of each optical fiber 40 is spaced from and faces a respective one of the second collimating portions 3131. A central axis of each optical fiber 40 is substantially perpendicular to the first emergent surface 313. In the embodiment, the first collimating portions 3111 and the second collimating portion 3131 are integrally formed with the first part 31.

The second part 32 can be quadrangular-prism shaped and includes a combining surface 321, a cutting surface 322, a second reflecting surface 323, and a second emergent surface 324. The combining surface 321, the cutting surface 322, the second reflecting surface 323, and the second emergent surface 324 are sequentially connected to each other. The combining surface 321 is contacted to the first emergent surface 313. An area of the combining surface 321 is less than an area of the first emergent surface 313. In the embodiment, the first part 31 and the second part 32 are integrally formed, namely the first emergent surface 313 is substantially coplanar with the combining surface 321. The cutting surface 322 is connected to and substantially perpendicular to the combining surface 321. The cutting surface 322 coincides with the bottom surface 3131 of each second collimating portion 3131. The second reflecting surface 323 is connected to the cutting surface 322 and an included angle between the second reflecting surface 323 and the cutting surface 322 is about 135 degrees, namely the second reflecting surface 323 is connected to the combining surface 321 (or the first emergent surface 313) via the cutting surface 322. In alternative embodiments, the cutting surface 322 is omitted and the second reflecting surface 322 is directly connected to the combining surface 321. The second emergent surface 324 is connected between the combining surface 321 and the second reflecting surface 323. The second emergent surface 324 is substantially perpendicular to the combining surface 321. An included angle between the second emergent surface 324 and the second reflecting surface 323 is about 45 degrees. The second part 32 also includes two second side surfaces 325. The second reflecting surface 323 is connected between and substantially perpendicular to the second side surfaces 325. Each second side surface 325 is substantially a right trapezoid.

Two third collimating portions 3241 are positioned on the second emergent surface 324. In the embodiment, the incident surface 311 is coplanar with the emergent surface 324, each third collimating portion 3241 partially extends to the incident surface 311 from the second emergent surface 324 and forms a circular convex lens. An optical axis of each third collimating portion 3241 is substantially perpendicular to the second emergent surface 324 and substantially parallel to the combining surface 321. In alternative embodiments, the incident surface 311 is not coplanar with the emergent surface 324, and each third collimating portion 3241 is positioned on the second emergent surface 324 but does not extend to the incident surface 311. The third collimating portions 3241 are integrally formed with the second part 32. Each third collimating portion 3241 corresponds to a first collimating portion 3111 a corresponding light emitting element 10 faces.

Each light intensity detector 50 is spaced from and faces one of the third collimating portions 3241. Each light intensity detector 50 is used to detect light intensity of a corresponding light emitting element 10.

In use, each light emitting element 10 projects diffuse light beams L1 into a corresponding first collimating portion 3111. The first collimating portion 3111 collimates the diffuse light beams L1 and forms parallel light beams L1 perpendicular to the incident surface 311. The parallel light beams L1 strike the first reflecting surface 312. The first reflecting surface 312 respectively reflects the parallel light beams L1 to a second collimating portion 3131 to form first light beams L11 and to the second reflecting surface 323 via the first emergent surface 213 to form second light beams L12. The first light beams L11 are converged by the corresponding second collimating portion 3131 and then projected to a corresponding optical fiber 40. The second light beams L12 strike the second reflecting surface 323 and are reflected to a corresponding third collimating portion 3241 by the second reflecting surface 323. Finally, the second light beams L12 are converged by the corresponding third collimating portion 3241 and projected to a corresponding light intensity detector 50. The light detector 50 detects light intensity of the second light beams L12 and determines if the light intensity of the second light beams L12 satisfies a predetermined level of intensity.

In the embodiment, a light intensity ratio of the first light beams L11 and the second light beams L12 is predetermined to be about 1:1. That is, the first light beams L11 and the second light beams L12 have substantially the same light intensity. Therefore, a determination can be made as to whether the light intensity of the first light beams L11 satisfies the predetermined level of intensity simply by detecting the light intensity of the second light beams L12.

The light intensity detector 50 further feeds back the light intensity of the second light beams L12 to the light emitting element 10, such that the light emitting element 10 can adjust a light intensity of the diffuse light beams L1 to intensify or weaken the diffuse light beams L1 to satisfy the predetermined level of intensity.

In alternative embodiments, the number of each of the light emitting elements 10, the light receiving elements 20, and the optical fibers 40 is not limited and can be set depending upon requirements. For example, in other embodiments, one light emitting element 10, one light receiving element 20, and two optical fibers 40 are employed. Accordingly, two first collimating portions 3111, two second collimating portions 3131, one collimating portion 3241, and one light intensity detector 50 are employed. Each of the light emitting element 10 and the light receiving element 20 is aligned and faces a respective first collimating portion 3111. One end of each optical fiber 40 faces a respective second collimating portion 3131. The light intensity detector 50 is aligned and faces the third collimating portion 3241.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the possible scope of the disclosure but do not restrict the scope of the disclosure.

What is claimed is:

1. An optical fiber assembly, comprising:
a prism comprising an incident surface, a first reflecting surface connected to the incident surface, a first emergent surface connected to the first reflecting surface, a second reflecting surface connected to the first emergent surface, and a second emergent surface connected to the second reflecting surface;
at least two first collimating portions positioned on the incident surface;
at least two second collimating portions positioned on the first emergent surface, each second collimating portion corresponding to one of the at least two first collimating portions;
at least one third collimating portion positioned on the second emergent surface;
at least one light emitting element facing and aligning with one of the at least two first collimating portions and configured for emitting light beams;
at least one light receiving element facing and aligning with one of the at least two first collimating portions;
at least two optical fibers, each optical fiber facing and aligning with one of the at least two second collimating portions; and
at least one light detector facing and aligning with one of the at least one third collimating portion;
wherein each first collimating portion collimates the light beams to form substantially parallel light beams striking the first reflecting surface, the first reflecting surface respectively reflects the parallel light beams to a corresponding second collimating portion to form first light beams and to the second reflecting surface via the first emergent surface to form second light beams; the first light beams are converged by the corresponding second collimating portion and projected to a corresponding optical fiber; the second light beams are reflected to a corresponding third collimating portion by the second reflecting surface, converged by the corresponding third collimating portion, and projected to a corresponding light intensity detector; the corresponding light intensity detector detects light intensity of the second light beams;
the prism comprises a substantially triangular-prism shaped first part, the first part comprises the incident surface, the first reflecting surface, and the first emergent surface sequentially connected to each other; the incident surface is substantially perpendicular to the first emergent surface, an included angle between the incident surface and the first reflecting surface is about 45 degrees, and an included angle between the first emergent surface and the first reflecting surface is about 45 degrees;
the optical fiber assembly comprises four first collimating portions, four second collimating portions, four optical fibers, two light emitting elements, two light receiving elements, and two light intensity detectors; each of the first collimating portions and the third collimating portions is a circular convex lens, each of the second collimating portions is a semi-circular convex lens;

each second collimating portion comprises a bottom surface substantially parallel to the incident surface;

the prism comprises a substantially quadrangular-prism shaped second part, the second part comprises a combining surface, a cutting surface, the second reflecting surface, and the second emergent surface sequentially connected to each other; the combining surface is substantially coplanar with the first emergent surface, the cutting surface is connected substantially perpendicularly to the combining surface, the cutting surface coincides with the bottom surface of each second collimating portion, the second reflecting surface is connected to the first emergent surface via the cutting surface, and the second emergent surface is connecting between the combining surface and the second reflecting surface; the second emergent surface and the cutting surface are substantially perpendicular to the combining surface, an included angle between the second reflecting surface and the cutting surface is about 135 degrees, and an included angle between the second emergent surface and the second reflecting surface is about 45 degrees.

2. The optical fiber assembly of claim 1, wherein the first part comprises two first side surfaces, the first reflecting surface is connected substantially perpendicularly between the first side surfaces, each first side surface is an isosceles triangle.

3. The optical fiber assembly of claim 1, wherein an area of the combining surface is less than an area of the first emergent surface.

4. The optical fiber assembly of claim 1, wherein the second part comprises two second side surfaces, the second reflecting surface is connected substantially perpendicularly between the second side surfaces, and each second side surface is a right trapezoid.

5. The optical fiber assembly of claim 1, wherein the second emergent surface is substantially coplanar with the incident surface, each third collimating portion partially extends to the incident surface from the second emergent surface.

6. The optical fiber assembly of claim 1, wherein a light intensity of the first light beams is determined by the light intensity of the second light beams and an intensity ratio of the first light beams and the second light beams; the intensity ratio of the first light beams and the second light beams is about 1:1.

* * * * *